United States Patent
Pernleitner et al.

(10) Patent No.: US 10,947,850 B2
(45) Date of Patent: Mar. 16, 2021

(54) BLADE FOR A TURBOMACHINE

(71) Applicant: MTU Aero Engines AG, Munich (DE)

(72) Inventors: Martin Pernleitner, Dachau (DE); Manfred Dopfer, Unterschleissheim (DE); Daniel Theurich, Stockdorf (DE)

(73) Assignee: MTU Aero Enginges AG, Munich (DE)

( * ) Notice: Subject to any disclaimer, the term of this patent is extended or adjusted under 35 U.S.C. 154(b) by 160 days.

(21) Appl. No.: 16/125,104

(22) Filed: Sep. 7, 2018

(65) Prior Publication Data

US 2019/0085700 A1 Mar. 21, 2019

(30) Foreign Application Priority Data

Sep. 20, 2017 (DE) ..................... 10 2017 216 620.7

(51) Int. Cl.
*F01D 5/14* (2006.01)
*F01D 5/22* (2006.01)

(52) U.S. Cl.
CPC ............ *F01D 5/141* (2013.01); *F01D 5/147* (2013.01); *F01D 5/225* (2013.01); *F05D 2240/123* (2013.01); *F05D 2240/301* (2013.01); *F05D 2240/305* (2013.01); *F05D 2250/12* (2013.01); *F05D 2260/941* (2013.01)

(58) Field of Classification Search
CPC .......... F01D 5/141; F01D 5/147; F01D 5/255; F05D 2240/123; F05D 2240/301; F05D 2240/305; F05D 2250/12; F05D 2260/941
See application file for complete search history.

(56) References Cited

U.S. PATENT DOCUMENTS

| | | | | |
|---|---|---|---|---|
| 4,257,741 A * | 3/1981 | Betts | ...................... | B22F 7/064 228/122.1 |
| 6,457,938 B1 * | 10/2002 | Liu | ..................... | F01D 5/141 415/148 |
| 9,011,081 B2 | 4/2015 | Gomez et al. | | |
| 9,506,347 B2 * | 11/2016 | Key | ..................... | F01D 5/141 |
| 2003/0118447 A1 | 6/2003 | Salvano | | |
| 2012/0128480 A1 * | 5/2012 | Gomez | ............... | F01D 5/141 415/208.1 |
| 2015/0361808 A1 | 12/2015 | Botrel et al. | | |
| 2018/0119555 A1 * | 5/2018 | Vogiatzis | ............. | F01D 9/041 |

FOREIGN PATENT DOCUMENTS

| | | | | |
|---|---|---|---|---|
| DE | 19612394 A1 | 10/1997 | | |
| EP | 1471209 | 10/2004 | | |
| EP | 1471209 A2 * | 10/2004 | ............ | F01D 5/16 |
| GB | 2381298 A * | 4/2003 | ............ | F01D 5/225 |
| WO | WO2011015193 A2 | 2/2011 | | |

OTHER PUBLICATIONS

Zhan et al.: "A 3D rigid-viscoplastic FEM simulation of compressor blade isothermal forging", Journal of Materials Processing Technology 117 (2001) 56-61.

* cited by examiner

Primary Examiner — Nathaniel E Wiehe
Assistant Examiner — Ryan C Clark
(74) Attorney, Agent, or Firm — Davidson, Davidson & Kappel, LLC

(57) ABSTRACT

A blade (10) for a turbomachine is provided. The blade (10) includes an airfoil (16) having at least one thickening (22) on a pressure side (20) of the airfoil (16). The thickening (22) has a region (B) of constant thickness (D). A turbomachine, a compressor and a turbine having stator vanes and/or rotor blades including at least one such blade (10) is also provided.

22 Claims, 4 Drawing Sheets

BLADE FOR A TURBOMACHINE

This claims the benefit of German Patent Application DE 10 2017 216 620.7, filed Sep. 20, 2017 and hereby incorporated by reference herein.

The present invention relates to a blade for a turbomachine, in particular for a gas turbine. The present invention further relates to a turbomachine, a compressor and a turbine having stator vanes and/or rotor blades.

BACKGROUND

In modern turbomachines, such as aircraft turbines, the blades of downstream stages in particular are subjected to very high static loading. In addition, there is dynamic excitation by a wide variety of excitations of certain orders. In the worst case, this combination can lead to damage to the blades. Therefore, it is known to locally thicken blades, starting from an aerodynamically optimal blade profile, so as to reduce the static and/or dynamic loads while affecting the aerodynamics as little as possible. WO 2011/015193 A2, for example, describes providing a pressure side of an airfoil of a blade with a convex thickening.

SUMMARY OF THE INVENTION

It is an object of the present invention to provide a blade for a turbomachine that has an aerodynamically favorable blade profile and, at the same time, high mechanical stability. Further objects of the present invention are to provide a turbomachine, a compressor and a turbine that each have stator vanes and/or rotor blades which are aerodynamically favorable and, at the same time, have high mechanical stability.

The present invention provides a blade having, a turbomachine, a compressor, as well as a turbine.

A first aspect of the present invention relates to a blade for a turbomachine, the blade including an airfoil having at least one thickening on a pressure side thereof. In accordance with the present invention, a blade profile that is aerodynamically favorable and, at the same time, has high mechanical stability is ensured by the thickening having a region of constant thickness. In other words, unlike the prior art, provision is made for the thickening not to be concave in shape, but to have a constant thickness, at least regionally. Thus, at least in this region of constant thickness, the local thickening follows the contour of the (imaginary) blade profile without thickening, as it were, in the manner of a postage stamp (patch). In contrast, the remaining regions of the airfoil may have an aerodynamically optimized and comparatively thinner airfoil profile. The local thickening of the airfoil reduces the static load on the blade. Due to the smaller static load on the blade, a greater reserve is created for the combination with vibratory loads. Preferably, the thickening is an integral part of the airfoil and/or is produced together with the airfoil by primary shaping. This may be accomplished by suitably adapting casting molds, which may already exist. Alternatively, the thickening may be additively produced together with the airfoil and/or using a cutting process. Alternatively, the thickening may be produced subsequently, for example by deposition welding or other coating processes, which makes it possible also to provide existing blades with the advantageous thickening. Generally, in the context of the present disclosure, "a" and "an" are to be read as indefinite articles and always also as "at least one," unless expressly stated otherwise. Conversely, "a" and "an" may also be understood to mean "only one."

An advantageous embodiment of the present invention provides that the region of constant thickness have a surface area equal to at least 20% of a total surface area of the thickening. In other words, it is provided that the surface area of the region of constant thickness be at least 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the total surface area of the thickening. This allows the mechanical stability to be optimally adjusted, taking into account the specific aerodynamic properties.

Another advantageous embodiment of the present invention provides that a maximum length of the region of constant thickness be at least 1% and/or no more than 90% of a maximum total length of the thickening. Thus, depending of the geometry of the region of constant thickness, it maximum length may be, for example, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% and/or 90%, 89%, 88%, 87%, 86%, 85%, 84%, 83%, 82%, 81%, 80% or less of the maximum total length of the thickening. If the thickening is, for example, at least substantially rectangular in configuration, then the maximum total length is at least substantially equal to the diagonal; if the thickening is, for example, substantially circular in shape, then the maximum total length is equal to diameter. In the case of other geometries, the maximum total length of the thickening and the maximum length of the region of constant thickness have to be individually determined correspondingly. In the context of the present disclosure, the terms "length" and "width" generally refer to an "axial extent," while the term "height" refers to a "radial extent" in the installed state of the blade. The thickening may in particular be configured such that the long-side to short-side ratio of the rectangle is ≤10:1, preferably ≤5:1, and in particular ≤2:1.

In another embodiment of the present invention, particularly high mechanical strength is achieved by configuring the thickening and/or the region of constant thickness to be at least substantially rectangular. An "at least substantially rectangular" geometry is understood to include both strictly rectangular or square geometries and corresponding geometries having one or more rounded corners.

Further advantages are obtained by the thickening being spaced apart from a leading edge and/or from a trailing edge of the airfoil. In other words, provision is made for the thickening not to directly adjoin the leading edge and/or the trailing edge of the airfoil, but to be disposed at a minimum distance relative to a tangent to the chord length of the airfoil. This avoids unnecessary impairment of the aerodynamic properties of the blade. For example, there may be provided a minimum distance from the tangent to the chord length of the airfoil which minimum distance is equal to at least the edge radius of the leading edge and/or trailing edge. Since the leading edge and/or trailing edge themselves/itself are/is not modified, the aerodynamic influence of the thickening is particular small.

A further advantageous embodiment of the present invention provides that the thickness of the region of constant thickness be at least 0.1 mm or at least 4% of a maximum airfoil thickness; i.e., for example or also at least 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm. 2.6 mm. 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm or more and/or no more than 1 mm, preferably 0.5 mm, or no more than 16% of a maximum airfoil thickness and/or that it be equal to no more than a value of a radius of the leading edge and/or of a radius of the trailing edge of the airfoil. In this context, the maximum airfoil thickness is equal to the diameter of the largest possible circle that can be drawn completely within an airfoil cross section.

Another advantageous embodiment of the present invention provides that the thickening extend from a radially outer end portion or end of the airfoil over no more than 20% and/or no less than 5% of a duct height. In other words, the thickening is formed on a radially outer end portion of the airfoil. The thickening may have a height or radially inward extent which may be, for example, equal to or at least 20%, 19%, 18%, 17%, 16%, 15%, 14%, 13%, 12%, 11%, 10%, 9%, 8%, 7%, 6%, 5%, 4%, 3%, 2%, 1% or less of a duct height associated with a blade. The duct height may generally be equal to the blade height (radial length), the blade typically being somewhat larger than the duct height at least at the inlet in order to reliably receive the working medium of the turbomachine and to better accommodate inaccuracies and thermal expansions.

In a further embodiment of the present invention, most advantageous aerodynamic properties are achieved by the thickening having at least one edge region whose thickness decreases continuously from the region of constant thickness to a nominal thickness of the airfoil without the thickening. This allows the flow to approach the thickening in a fluid-mechanically particularly advantageous and undisturbed manner.

Another advantageous embodiment of the present invention provides that the edge region surround the region of constant thickness in a U-shaped manner. This makes it possible to obtain a fluid-mechanically particularly favorable incident and outgoing flow. This is especially advantageous when the thickening terminates radially outwardly with a radial end portion of the airfoil.

Further advantages are obtained by an axial extent, in particular a maximum axial extent, of the thickening being no more than 70% and/or no less than 10% of a chord length of the airfoil at the level of the thickening. An extent of no more than 70% of the chord length of the airfoil is understood to include in particular extents of 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10% or less. The maximum axial extent or width may be, for example, two-thirds or less of the chord length of the airfoil at the level of the thickening.

By designing the blade as an, in particular variable, stator vane or as a rotor blade, the advantages of the present invention may be realized in a particularly flexible manner for different blade types and stages of a turbomachine.

A further advantageous embodiment of the present invention provides that the airfoil be delimited by a radially outer shroud and/or a radially inner shroud. This makes it possible to additionally stabilize the blade against vibrations and to axially seal a flow path of the working medium of the associated turbomachine. Moreover, two or more blades may, in some instances, be connected together by a common shroud to form a blade cluster.

A second aspect of the present invention relates to a turbomachine, in particular a gas turbine, having stator vanes and/or rotor blades which, in accordance with the present invention, are aerodynamically favorable and, at the same time, have high mechanical stability because they include at least one blade according to the first aspect of the present invention. Other features and the advantages derived therefrom will become apparent from the descriptions of the first aspect of the present invention.

A third aspect of the present invention relates to a compressor of a turbomachine, in particular a low-pressure or high-pressure compressor, having stator vanes and/or rotor blades which, in accordance with the present invention, are aerodynamically favorable and, at the same time, have high mechanical stability because they include at least one blade according to the first aspect of the present invention. Other features and the advantages derived therefrom will become apparent from the descriptions of the first aspect of the present invention.

A fourth aspect of the present invention relates to a turbine of a turbomachine, in particular a low-pressure or high-pressure turbine, having stator vanes and/or rotor blades which, in accordance with the present invention, are aerodynamically favorable and, at the same time, have high mechanical stability because they include at least one blade according to the first aspect of the present invention. Other features and the advantages derived therefrom will become apparent from the descriptions of the first aspect of the present invention.

Other features of the present invention will become apparent from the claims, the figures, and the detailed description. The features and feature combinations mentioned above in the description as well as the features and feature combinations mentioned below in the description of the figures and/or shown in isolation in the figures are usable not only in the respectively specified combination, but also in other combinations without departing from the scope of the present invention. Thus, embodiments of the invention which are not explicitly shown in the figures or described, but derive from and can be produced by separate feature combinations from the explained embodiments are also considered to be included and disclosed herein. In addition, embodiments and combinations of features that therefore do not have all of the features of an originally formulated independent claim are also considered to be disclosed herein. Moreover, embodiments and combinations of features that go beyond or differ from the combinations of features set forth in the back-references of the claims should be regarded as having been disclosed, in particular by the explanations given above.

DETAILED DESCRIPTION

Figure 1:
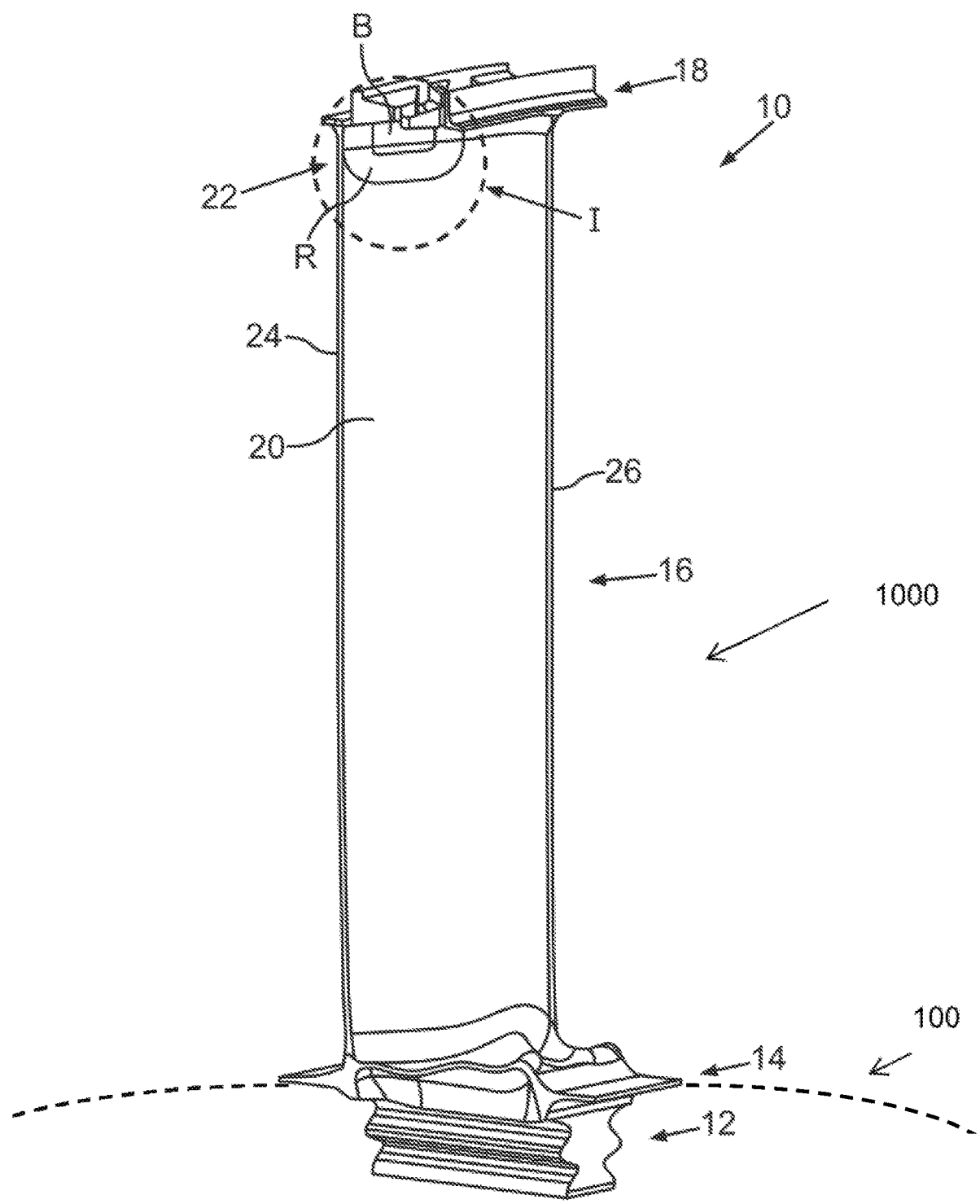
FIG. 1 is a perspective view of an exemplary embodiment of an inventive blade for a turbomachine.
Figure 2:
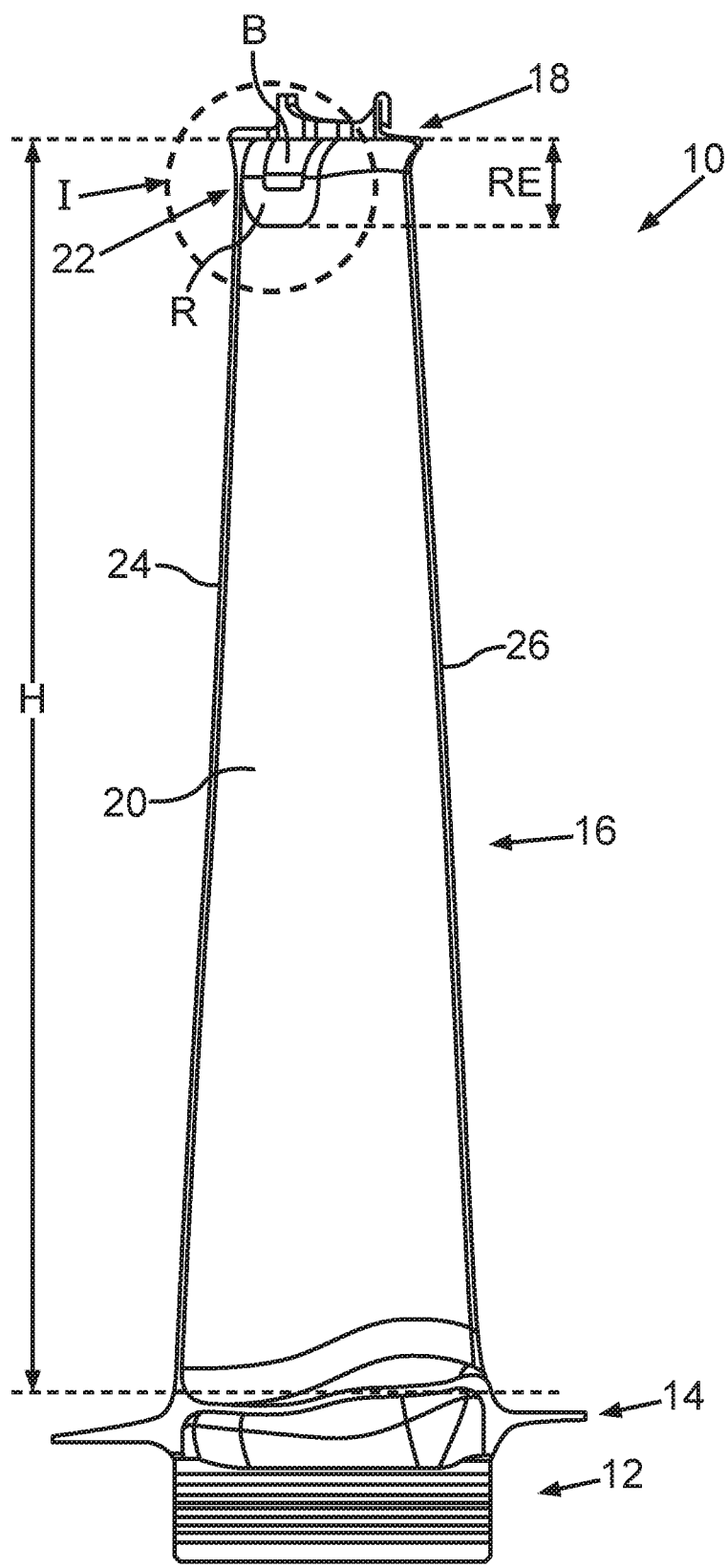
FIG. 2 is a side view of the blade shown in FIG. 1.
Figure 3:
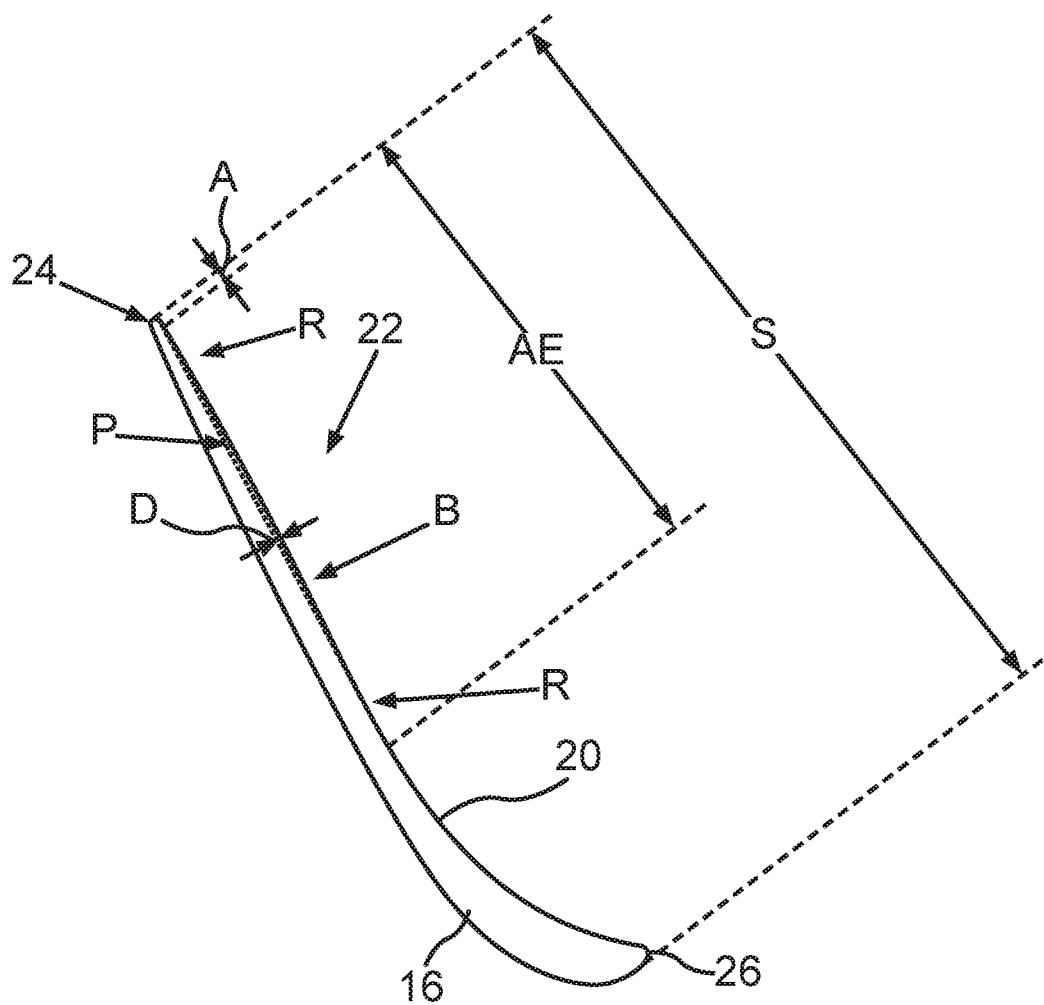
FIG. 3 is a cross-sectional view showing the blade in the region of a thickening.

FIG. 1 shows, in perspective view, an exemplary embodiment of an inventive blade 10 for a turbomachine with a low- or high-pressure compressor or turbine 100 (shown schematically), for example, for an aircraft engine 1000, such as a gas turbine. FIG. 1 will be described below in conjunction with FIGS. 2 and 3. FIG. 2 shows a side view of the blade 10 shown in FIG. 1, and FIG. 3 shows a cross-sectional view of blade 10 in the region of a thickening 22. In the exemplary embodiment shown, blade 10 includes a blade root 12, a radially inner shroud 14, an airfoil 16, as well as a radially outer shroud 18. On a pressure side 20 of airfoil 16, a thickening 22, which may also be referred to as a "patch," is located in the region designated by reference character I. As can be seen, thickening 22 is placed like a postage stamp on pressure side 20 in the radially outer region of airfoil 16 toward a trailing edge 24, and, in the present case, has a substantially rectangular shape having two rounded corners. Thickening 22 has a region B which has a constant thickness D and is surrounded in a U-shaped manner by an edge region R. Thickness D of edge region R decreases continuously from region B of constant thickness D to a nominal thickness of airfoil 16 without thickening 22. In other words, the transition from region B of constant thickness D into the original aerodynamic profile is continuous, so that, outside of thickening 22, airfoil 16 has an aerodynamically optimized blade profile P again. Upwardly; i.e., radially outwardly, thickening 22 has no edge region R, but adjoins radially outer shroud 18.

Figure 4:
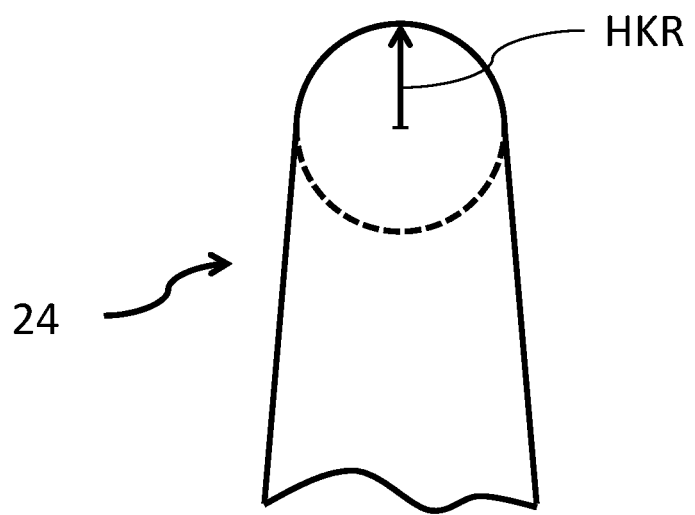
FIG. 4 shows schematically a trailing edge region of the blade of FIG. 3.

Thickening 22 is spaced apart from trailing edge 24 by a distance A (FIG. 3). Distance A is approximately equal to a radius HKR (FIG. 4) of trailing edge 24. Therefore, trailing edge 24 itself is not modified by thickening 22. In the present case, the maximum total length or axial extent AE of thickening 22 is approximately two-thirds of chord length S of airfoil 16 at the level of thickening 22, so that a leading edge 26 of airfoil 16 also remains unmodified. In the present case, region B of constant thickness D extends axially over approximately two-thirds of the total length of thickening 22, so that edge region R extends over approximately one-third of the total length of thickening 22.

In the present case, the maximum radial extent RE (FIG. 2) or height of thickening 22 is approximately 15% or less of a duct height H, as measured from outer shroud 18. As shown in FIG. 2, duct height H is determined in the region of trailing edge 24 and is equal to the radial extent or height of airfoil 16 between radial shrouds 14, 18, possibly plus a tolerance. Region B of thickening 22; i.e., the region of constant distance from the original blade profile P, has a thickness D which, in the present case, may be selected between 0.1 mm and a value equal to radius HKR of trailing edge 24.

The parameter values given in the documents for defining measurement conditions for the characterization of specific properties of the subject matter of the present invention are to be considered as within the scope of the present invention, even in the context of deviations, e.g., due to measurement errors, system errors, DIN tolerances, and the like.

LIST OF REFERENCE NUMERALS 10 blade
12 blade root
14 shroud
16 airfoil
18 shroud
20 pressure side
22 thickening
24 trailing edge
26 leading edge
I region
B region of constant thickness
D thickness
R edge region
P airfoil profile
HKR radius of trailing edge 24
S chord length
H duct height
RE radial extent
AE axial extent

What is claimed is:

1. A blade for a turbomachine, the blade comprising:
   an airfoil having at least one thickening on a pressure side of the airfoil, wherein the thickening has a region of constant thickness;
   wherein the thickening has at least one edge region whose thickness decreases continuously from the region of constant thickness to a nominal thickness of the airfoil without the thickening; wherein the edge region surrounds the region of constant thickness in a U-shaped manner.

2. The blade as recited in claim 1 wherein the region of constant thickness has a surface area equal to at least 20% of a total surface area of the thickening.

3. The blade as recited in claim 1 wherein a maximum length of the region of constant thickness is at least 1% or no more than 90% of a maximum total length of the thickness.

4. The blade as recited in claim 1 wherein the thickening or the region of constant thickness is configured in the shape of a rectangle.

5. The blade as recited in claim 4 wherein the rectangle has a long-side to short-side ratio of ≤10:1.

6. The blade as recited in claim 5 wherein the rectangle has a long-side to short-side ratio of ≤5:1.

7. The blade as recited in claim 6 wherein the rectangle has a long-side to short-side ratio of ≤2:1.

8. The blade as recited in claim 1 wherein the thickening is spaced apart from a leading edge or from a trailing edge of the airfoil.

9. The blade as recited in claim 1 wherein the thickness of the region of constant thickness is at least 0.1 mm or 4% of a maximum airfoil thickness or no more than 1 mm or no more than 16% of a maximum airfoil thickness or is equal to no more than a value of a radius of the leading edge or of a radius of the trailing edge of the airfoil.

10. The blade as recited in claim 9 wherein the thickness of the region of constant thickness is no more than 0.5 mm.

11. The blade as recited in claim 1 wherein the thickening extends from a radially outer end portion or end of the airfoil over no more than 20% or no less than 5% of a duct height.

12. The blade as recited in claim 1 wherein an axial extent of the thickening is no more than 70% or no less than 10% of a chord length of the airfoil at a level of the thickening.

13. The blade as recited in claim 12 wherein the axial extent is a maximum axial extent of the thickening.

14. The blade as recited in claim 1 wherein the blade is designed as a stator vane or as a rotor blade.

15. The blade as recited in claim 1 wherein the blade is designed as a variable stator vane.

16. The blade as recited in claim 1 wherein the airfoil is delimited by a radially outer shroud or a radially inner shroud.

17. A turbomachine comprising stator vanes or rotor blades including at least one blade as recited in claim 1.

18. A gas turbine comprising the turbomachine as recited in claim 17.

19. A compressor of a turbomachine, the compressor comprising stator vanes or rotor blades including at least one blade as recited in claim 1.

20. A low-pressure or high-pressure compressor comprising the compressor as recited in claim 19.

21. A turbine of a turbomachine comprising stator vanes or rotor blades including at least one blade as recited in claim 1.

22. A low-pressure or high-pressure turbine comprising the turbine as recited in claim 21.

\* \* \* \* \*